United States Patent
Chung et al.

(10) Patent No.: US 11,039,342 B1
(45) Date of Patent: Jun. 15, 2021

(54) REVERSE SLOT RESERVATION METHOD AND DEVICE IN INDUSTRIAL LOW-POWER WIRELESS NETWORK

(71) Applicant: Pusan National University Industry-University Cooperation Foundation, Busan (KR)

(72) Inventors: Sanghwa Chung, Busan (KR); Yuvin Ha, Gimhae-si (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 16/952,524

(22) Filed: Nov. 19, 2020

(30) Foreign Application Priority Data

Nov. 5, 2020 (KR) .......................... 10-2020-0147150

(51) Int. Cl.
| | |
|---|---|
| *H04W 28/26* | (2009.01) |
| *H04W 52/02* | (2009.01) |
| *H04W 72/04* | (2009.01) |
| *H04W 72/12* | (2009.01) |
| *H04W 4/80* | (2018.01) |

(52) U.S. Cl.
CPC .......... *H04W 28/26* (2013.01); *H04W 52/02* (2013.01); *H04W 72/0446* (2013.01); *H04W 4/80* (2018.02); *H04W 72/1205* (2013.01)

(58) Field of Classification Search
CPC . H04W 28/26; H04W 52/02; H04W 72/0446; H04W 72/1205; H04W 4/80; H04W 52/0216
See application file for complete search history.

(56) References Cited

U.S. PATENT DOCUMENTS

| | | | |
|---|---|---|---|
| 9,774,534 B2* | 9/2017 | Vasseur ............. | H04W 72/0446 |
| 9,800,506 B2* | 10/2017 | Vasseur ............. | H04W 72/1252 |
| 10,757,648 B2* | 8/2020 | Uhling ............. | H04W 72/1289 |
| 10,904,882 B2* | 1/2021 | Thubert ............. | H04W 40/02 |
| 2016/0174192 A1* | 6/2016 | Raghu ............. | H04W 72/1289 370/329 |
| 2017/0064702 A1* | 3/2017 | Li ............. | H04W 74/0816 |
| 2019/0104519 A1* | 4/2019 | Sydir ............. | H04L 41/12 |
| 2020/0008146 A1* | 1/2020 | Uhling ............. | H04W 52/0216 |
| 2020/0187244 A1* | 6/2020 | Tian ............. | H04W 74/002 |
| 2020/0351930 A1* | 11/2020 | Luo ............. | H04L 1/0061 |

* cited by examiner

*Primary Examiner* — Brain T O Connor
(74) *Attorney, Agent, or Firm* — Paratus Law Group, PLLC

(57) ABSTRACT

Disclosed is a device for reverse slot reservation in an industrial low-power wireless network, which includes: a child device configured to send a slot demand of the child device to a parent device through an information element (IE) and a solicitation (SOLICIT) packet included in an enhanced beacon (EB) and configured to select a required number of slots and respond using a Response packet to reserve the slots when an OFFER is received; and a parent device configured to transmit an OFFER packet to a device with the highest priority or a device selected in round-robin order when there is no priority on the basis of slot demands of child devices to start reverse slot reservation and configured to select some slots from among available slots of the parent device, add the selected slots to CellList, and transmit the OFFER packet to a corresponding child device.

17 Claims, 9 Drawing Sheets

| Version | Type | Rsrvd | Code(1 byte) | SFID(1 byte) | SeqNum(1 byte) |
|---|---|---|---|---|---|
| Metadata | | | | CellOptions | NumCells |

| CellList to ADD(4 bytes for one cell) ••• |
|---|
| CellList to Delete(4 bytes for one cell) ••• |

| Version | Type | Rsrvd | Code(1 byte) | SFID(1 byte) | SeqNum(1 byte) |
|---|---|---|---|---|---|
| NumADDCells (1 byte) | CellList to ADD(4 bytes for one cell) ••• | | | | |

| CellList to Delete(4 bytes for one cell) ••• |
|---|

REVERSE SLOT RESERVATION METHOD AND DEVICE IN INDUSTRIAL LOW-POWER WIRELESS NETWORK

ACKNOWLEDGEMENT

This research was supported by the Korean Government, Ministry of Science and ICT (MSIT, Republic of Korea), under a Grand Information Technology Research Center support program (IITP-2020-2016-0-00318) supervised by the Institute for Information & Communications Technology Planning & Evaluation (IITP).

CROSS-REFERENCE TO RELATED APPLICATION

This application claims priority to Korean Patent Application No. 10-2020-0147150, filed on Nov. 5, 2020, which is hereby incorporated by reference in its entirety.

BACKGROUND

The present invention relates to an industrial low-power wireless network, and more particularly, to a method and device for reverse slot reservation in an industrial low-power wireless network, the method and device using reverse slot reservation to implement stable slot reservation even in a congested industrial wireless network environment.

Time Slotted Channel Hopping (TSCH) Media Access Control (MAC) technology is a MAC technology included in the IEEE 802.15.4e MAC amendment and is a standard technology for industrial wireless sensor networks such as WirelessHART and ISA100.11a with a high level of reliability and stability. The IEEE 802.15.4e MAC amendment was included in the official standard in 2015, and the IEEE 802.15.4-2015 standard adopted TSCH MAC as an official MAC mode.

FIG. 1 is a configuration diagram showing general wireless network topology (on the left side) and example TSCH slot frame scheduling (on the right side).

All devices participating in a TSCH network are time-synchronized, operate on a time slot basis, and form a slot frame by grouping several time slots. The length of a slot frame refers to the number of time slots constituting the slot frame and is continuously repeated while the network is operating. In every communication, each device performs channel hopping and determines a frequency to be used for actual communication through Equation 1.

Absolute Slot Number (ASN) refers to the sequence of time slots counted from a network start time of 0. A corresponding channel is selected using a function F[ ] that refers to a channel lookup table by performing a modulo operation on the number of available channels.

$$ch = F[(ASN + channelOffset) \% numChannel] \quad [\text{Equation 1}]$$

An example of FIG. 1 is a slot frame with a length of 6, and communication is performed using four channels.

As described above, TSCH MAC is a Time Division Multiple Access (TDMA)-based multi-channel utilization technology, and devices in a TSCH network should select one of a sleep operation, a transmit operation, and a receive operation in one time slot and determine on which time slot communication will be performed through which channel when the transmit operation and the receive operation are designated.

This problem is called TSCH slot scheduling and is an essential technology for providing a high level of reliability and stability in TSCH MAC.

Slot scheduling is performed in units of a continuously repeated slot frame and is for assigning a link grouping a channel-offset (channelOffset), which is an index of an available channel list, and a slot-offset (slotOffset), which is a relative time in the slot fame, to two devices.

The two devices may stably perform communication using a time and channel promised in the assigned link (slotOffset, channelOffset). However, such scheduling should be performed by comprehensively considering an interference relationship between neighbors, an interference relationship in a propagation range, a loss probability corresponding to link quality, a required bandwidth corresponding to the amount of traffic, and the like.

However, the IEEE 802.15.4e standard, which defines the TSCH mechanism, does not define a scheduling method.

IETF 6TiSCH Working Group (WG) expects that the high reliability and stability of TSCH will be suitable for Internet of things (IoT) environments, and for this purpose, 6Top sub-layers have been defined to facilitate the setting and management of TSCH MAC.

The 6Top layer defines 6top Protocol (6P), which is a protocol for slot reservation between devices, and a slot may be mutually reserved using 6P.

Table 1 below includes 6P command code.

TABLE 1

| Command | Code | Description |
|---|---|---|
| ADD | 1 | Add one or more slots |
| DELETE | 2 | Delete one or more slots |
| RELOCATE | 3 | Relocate reserved slot |
| COUNT | 4 | Check number of reserved slots |
| LIST | 5 | Check list of reserved slots |
| SIGNAL | 6 | Command usable in individual SF |
| CLEAR | 7 | Initialize slot schedule |

Table 2 below includes 6P return code.

TABLE 2

| Return Code | Description |
|---|---|
| RC_SUCCESS | Success |
| RC_EOL | End of list in LIST command |
| RC_ERR | General error |
| RC_RESET | Critical error, transaction rest |
| RC_ERR_VERSION | Not supported 6P version |
| RC_ERR_SFID | Not supported SFID |
| RC_ERR_SEQNUM | Slot schedule mismatching |
| RC_ERR_CELLLIST | Slot list error in transaction |
| RC_ERR_BUSY | Busy state due to same transaction |
| RC_ERR_LOCKED | Locked state due to different transaction |

On-The-Fly (OTF) Scheduling Function (SF), which is one of the most basic slot scheduling methods, is a technique for adding or removing slots by comparing the number of packets to be processed per unit time and the number of currently reserved slots.

For example, assuming that one slot is reserved between devices A and B in a TSCH network in which the length of a time slot is 10 ms and the length of a slot frame is 100, it takes one second to complete one slot frame, and devices A and B may communicate with each other once a second. At this time, when two packets to be sent from A to B are generated per second, one packet per second is not transmitted and is continuously accumulated, and thus is finally discarded.

Therefore, in the OTF, by comparing the number of packets to be processed per unit time (two packets per second) and the number of currently reserved slots (one packet per second), one slot is further reserved so that packets can be transmitted without loss. On the contrary, if the number of reserved slots is too large, the slot reservation is released to reduce energy consumption. In the OTF, when an additional slot needs to be allocated, a time slot offset and a channel offset are selected among available time slots to reserve the slot.

In this way, when the addition (or deletion) of a specific slot is determined in the SF, a device should reserve a slot for communication by negotiating with a counterpart device. Since such a method is not defined in the IEEE 802.15.4 TSCH standard, 6TiSCH has defined 6P as an interface for the reservation.

A device that determines the reservation of an additional slot transmits a Request packet containing a slot list to be added and an ADD command in Table 1 to a counter device, and a device who has received a request checks whether slot reservation is possible and performs a 6P transaction in which a Response packet containing the return code of Table 2 is transmitted.

FIG. 2 shows an example of a general 6P transaction.

All devices have transaction sequence numbers for corresponding counterpart devices recorded thereon and transmit the transaction sequence numbers included in the 6P transaction. When transaction sequence numbers SeqNum do not match each other, it is not possible to guarantee the matching of both slot schedule reservations.

Therefore, it is necessary to return and process RC_ERR_SEQNUM in Table 2. The easiest way is to initialize both schedules using the CLEAR command in Table 1 and re-reserve the schedules, but this causes a great deal of packet loss and energy consumption and thus adversely affects network performance.

FIG. 3 is an example of a 6P transaction using an autonomous cell.

The 6P transaction is a packet exchange for assigning a TSCH slot schedule, but mutual slot reservations are required to transmit request/response packets for the transaction.

In order to efficiently process this slot reservation, 6TiSCH employs an autonomous cell.

Since the autonomous cell is automatically determined as a value obtained by hashing a counterpart's MAC address, it is possible to determine which slot to use for the 6P transaction without a separate slot reservation when the MAC address is confirmed.

Device B may use a slot obtained by hashing the MAC address of device A to transmit a 6P request and send a request to device A using the slot. On the contrary, device A may transmit a response using a slot that uses the MAC address of device B.

The overall network formation flow is as follows.

A device that has already participated in a network periodically transmits an enhanced beacon (EB) defined in the IEEE 802.15.4 to inform about the presence of the network.

These packets are generally transmitted through a minimal cell of FIG. 3.

A device that intends to participate in the network receives the EB, is synchronized according to a counterpart's TSCH timing, and reserves a basic slot using minimal cell information specified in the EB (MAC layer connection is completed). In order to establish a path, the synchronized device waits for the reception of DIO transmitted from the minimal cell.

When the path is established through the reception of the DIO, the device initiates a slot assignment procedure for communication with a counterpart device.

A slot reservation is determined according to the policy of the SF, and a slot is reserved through a 6P transaction. Data packet transmission is started through the reserved slot.

As described above, although the IEEE 802.15.4 TSCH MAC can provide reliability through coordinated communication based on slot scheduling even in an industrial environment, the standard does not define a slot schedule generation method and a slot reservation method. In order to solve this problem, the IETF 6TiSCH working group defines a basic slot scheduling method and slot reservation method, but in an industrial wireless network in which many data packets are generated, it is difficult for the slot reservation method of the 6TiSCH to provide stable performance.

Accordingly, there is a need to develop a new technique to enable stable slot reservation even in an industrial wireless network environment congested due to many data packets.

SUMMARY

The present invention is intended to solve a problem of conventional industrial low-power wireless network technology and is directed to providing a method and device for reverse slot reservation in an industrial low-power wireless network, the method and device using reverse slot reservation to implement stable slot reservation even in a congested industrial wireless network environment.

The present invention is directed to providing a method and device for reverse slot reservation in an industrial low-power wireless network, the method and device allowing stable operation of TSCH MAC by allowing stable slot reservation between devices even in a congested 6TiSCH-based industrial wireless network.

The present invention is directed to providing a method and device for reverse slot reservation in an industrial low-power wireless network, the method and device capable of reducing packet loss due to slot shortage and establishing a robust network to increase normal network operation time by providing stable slot reservation of TSCH MAC.

The present invention is directed to providing a method and device for reserve slot reservation in an industrial low-power wireless network, the method and device capable of preventing 6P packets indiscriminately generated by multiple child devices in a high-traffic network from being concentrated in a single autonomous Rx cell of a parent device using reverse slot reservation in which the parent device initiates a 6P transaction to perform mutual slot reservation The present invention is not limited to the above objectives, and other objectives not described herein may be clearly understood by those skilled in the art from the following description.

According to an aspect of the present invention, there is provided a device for reverse slot reservation in an industrial low-power wireless network, the device including a child device configured to send a slot demand of the child device to a parent device through an information element (IE) and a solicitation (SOLICIT) packet included in an enhanced beacon (EB) and configured to select a required number of slots and respond using a Response packet to reserve the slots when an offer (OFFER) is received and a parent device configured to transmit an OFFER packet to a device with the highest priority or a device selected in round-robin order when there is no priority on the basis of slot demands of child devices to start reverse slot reservation and configured to select some slots from among available slots of the parent device, add the selected slots to CellList, and transmit the OFFER packet to a corresponding child device.

Here, the child device may continuously compute a slot demand to be added or deleted and may send a response to the parent device on the basis of the slot demand when the OFFER packet is received from the parent device, thereby performing reverse slot reservation.

Also, when the slot demand included in the EB of each of the child devices is not zero or when the SOLICIT is received, the parent device may transmit an OFFER to a corresponding child device to perform slot reservation.

Also, the parent device may continuously transmit an OFFER so that there are no devices that do not receive the OFFER even if a slot request is not generated in consideration of the possibility that the EB and SOLICIT will not be normally transmitted due to continuous collision and interference.

Also, the child device may include a slot demand computation unit configured to compute a slot demand necessary to process traffic on the basis of traffic information measured in an upper layer (L2: Internet layer), an EB transmission unit configured to expand an IE defined in IEEE 802.15.4 and transmit an EB including a slot demand and an address of a target device that wants slot reservation, a slot reservation determination unit configured to compare the computed slot demand to a slot demand computed in a previous period and determine whether an appropriate number of slots are currently reserved, a counter management unit configured to initialize a counter when it is determined that the appropriate number of slots are reserved and increase the counter when the traffic is not resolved, and a SOLICIT request unit configured to determine that the EB is lost and transmit a SOLICIT request when the counter is not initialized for a certain period of time.

Also, the parent device may include an EB receiving unit configured to receive an EB including an address and a slot demand of a target device, which wants slot reservation, from the child device, a SOLICIT receiving unit configured to receive a SOLICIT request from the child device, a child device list acquisition unit configured to acquire a list of child devices that have generated a slot demand from a neighboring table, an index selection unit configured to select an index of a device to which an OFFER is to be transmitted in a round-robin manner from the list of child devices, a transmission period management unit configured to use a value obtained by dividing a basic period value, which ensures that the OFFER will be provided to each child device, by the number of child devices as a slot OFFER period, and an OFFER transmission unit configured to transmit an OFFER including a list of available slots of the parent device to the device with the selected index.

According to another aspect of the present invention, there is provided a method for reverse slot reservation in an industrial low-power wireless network, the method including allowing a child device to send a slot demand of the child device to a parent device through an information element (IE) and a solicitation (SOLICIT) packet included in an enhanced beacon (EB), allowing the parent device to transmit an OFFER packet to a device with the highest priority or a device selected in a round-robin order when there is no priority on the basis of slot demands of child devices to start reverse slot reservation, and allowing the child device to select a required number of slots and respond using a response packet to reserve the slots when an OFFER is received.

Here, the parent device may transmit the OFFER packet to initiate a transaction, the parent device may select some slots from among available slots of the parent device, add the selected slots to CellList, and transmits the OFFSET packet to the child device, and the length of CellList may vary depending on network settings.

Also, the child device may specify, in NumAddCells, the number of required slots of CellList including reservable slots sent by the parent device, which is an OFFER provider, and may respond with a list of slots to be added or deleted.

Also, the child device may continuously compute a slot demand to be added or deleted and may send a response to the parent device on the basis of the slot demand when the OFFER packet is received from the parent device, thereby performing reverse slot reservation.

Also, a SOLICIT request generated by the child device may include computing a slot demand necessary to process traffic on the basis of traffic information measured in an upper layer (L2: Internet layer), comparing the computed slot demand to a slot demand computed in a previous period and determining whether an appropriate number of slots are currently reserved, initializing a counter when it is determined that the appropriate number of slots are reserved, and increasing the counter when the traffic is not resolved and determining that the EB is lost and transmitting the SOLICIT request when the counter is not initialized for a certain period of time.

Also, NumCells information for sending a slot demand may be maintained in a frame for transmitting a SOLICIT, and when the OFFER packet is received, the child device may select a required number of slots according to its own slot request and may respond using a Response packet, and when the response is successfully transmitted, sequence numbers of the parent device and the child device may be updated, and slot reservation on both sides is may be completed.

Also, a slot OFFER procedure of the parent device may include receiving EBs and SOLICITs of child devices to check slot demands of the child devices and transmitting an OFFER to a corresponding child device to perform slot reservation when the slot demand included in the EB of each of the child devices is not zero or when the SOLICIT is received.

Also, the parent device may continuously transmit an OFFER so that there are no devices that do not receive the OFFER even if a slot request is not generated in consideration of the possibility that the EB and SOLICIT will not be normally transmitted due to continuous collision and interference.

Also, a slot OFFER procedure of the parent device may include acquiring a list of child devices that have generated a slot demand from a neighboring table, determining whether a child device has a slot demand and selecting a device having the highest slot demand from the list of child devices when some child devices have slot demands, periodically selecting a device indexed as the next SOLICIT target when no child device generates a slot demand, and creating an OFFER list and transmitting an OFFER including a list of available slots of the parent device to the selected device.

Also, the selecting of a device having the highest slot demand may include selecting an index of a device to which an OFFER is to be transmitted from a list of child devices of the parent device in a round-robin manner when a slot request generation list is empty.

Also, in the transmitting of an OFFER, a variable period may be used to transmit the OFFER to all of the child devices in the same period, and a value obtained by dividing a basic period value for ensuring that the OFFER will be provided to each child device by the number of child devices may be used as the period of the slot OFFER.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 7A and 7B are configuration diagrams showing an offer (OFFER) request format and an OFFER response format;

DETAILED DESCRIPTION

Hereinafter, exemplary embodiments of a device and method for reverse slot reservation in an industrial low-power wireless network according to the present invention will be described as follows.

The features and advantages of the device and method for reverse slot reservation in an industrial low-power wireless network according to the present invention will become apparent from the detailed description of the following embodiments.

Figure 4:
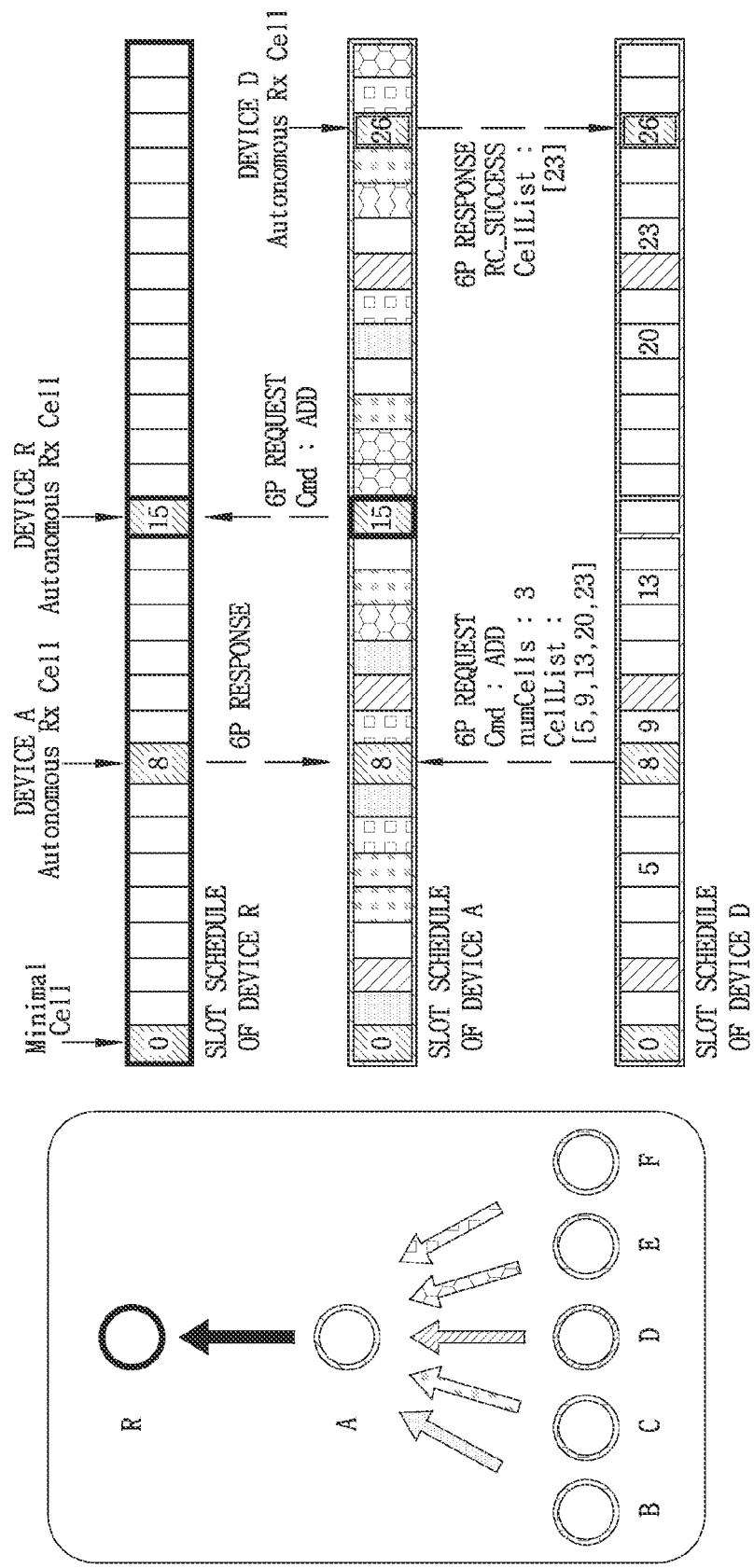
FIG. 4 is a configuration diagram showing an example of an interference relationship in a 6P transaction.

FIG. 4 is a configuration diagram showing an example of an interference relationship in a 6P transaction.

Figure 5:
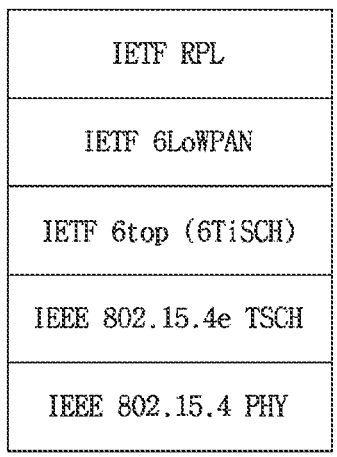
FIG. 5 is a stack configuration diagram of an IETF IoT network.
Figure 6:
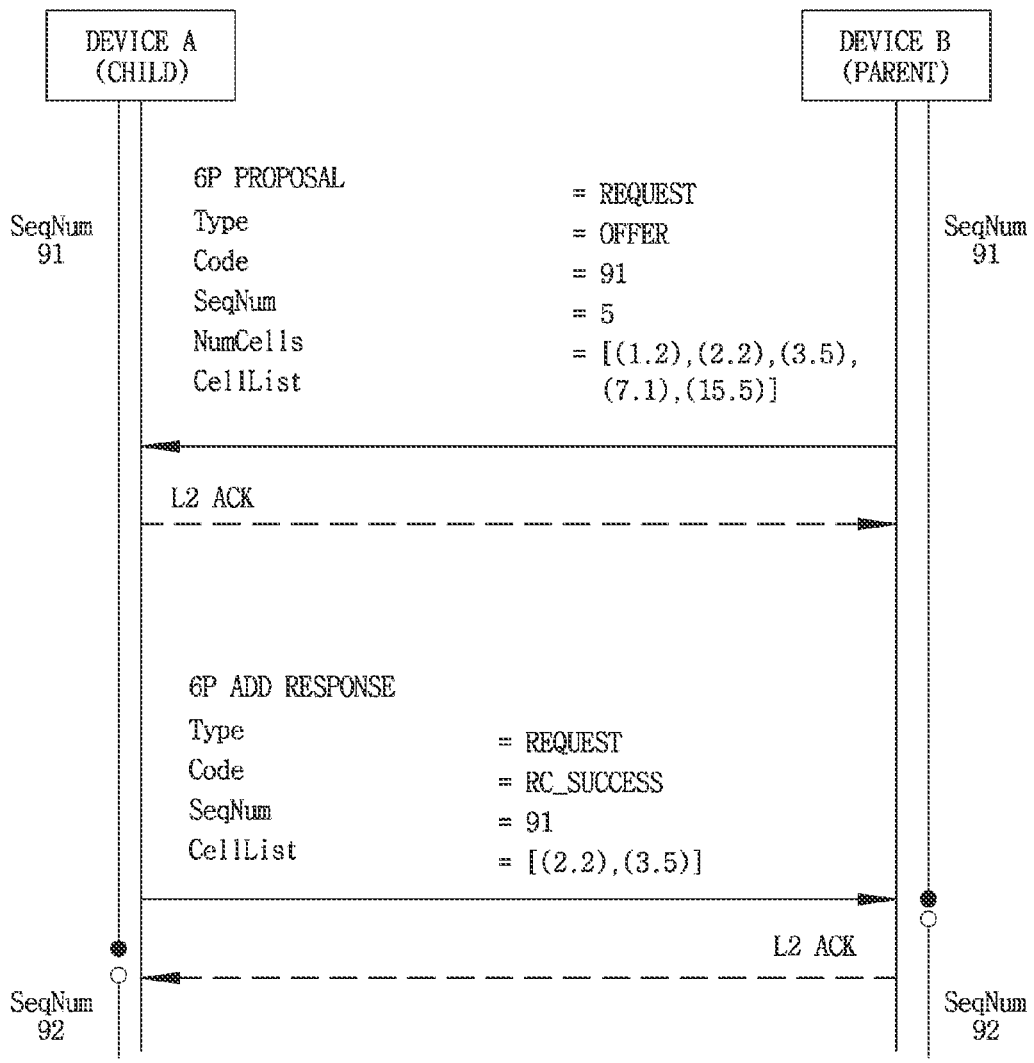
FIG. 6 is a configuration diagram showing an example of a reverse 6P transaction.

Also, FIG. 5 is a stack configuration diagram of an IETF IoT network, and FIG. 6 is a configuration diagram showing an example of a reverse 6P transaction.

The device and method for reverse slot reservation in an industrial low-power wireless network according to the present invention use reverse slot reservation to enable stable slot reservation even in a congested industrial wireless network environment, thereby enabling stable operation of TSCH MAC.

The present invention is directed to preventing 6P packets indiscriminately generated by multiple child devices in a high-traffic network from being concentrated in a single autonomous Rx cell of a parent device using reverse slot reservation in which the parent device initiates a 6P transaction to perform mutual slot reservation.

Even in the industrial field, smart factories, intelligent manufacturing processes, and the like are attracting great interest, and a technology called Industrial IoT (IIoT), which is an IoT technology for industry, is spotlighted as a new trend.

In the IIoT, various kinds of status information (temperature, vibration, etc.) of a device are collected, and various application services are expected to be provided based on collected data.

In particular, in the IIoT of the industrial field, a lot of data is generated in tens to hundreds of facilities, and the IEEE 802.15.4 TSCH is required to be able to reliably transmit such data.

In most wireless networks, data is transmitted to a gateway (or sink) such as a Wi-Fi access point (router) and is sent to a final destination server or DB through a wired network (a field network or a backbone network).

Therefore, inevitably, data in the wireless network is concentrated in a gateway, and in a multi-hop network, a device closer to the gateway transmits more data.

A device closer to a gateway should reserve more slots to transmit a large amount of data and process 6P requests made by many devices in a lower path.

FIG. 4 illustrates an interference relationship in a 6P transaction that may occur in such a multi-hop wireless network.

Device A communicates with devices B to F corresponding to a lower path (=child) of the network and reserves a slot through a 6P transaction using an autonomous cell of 6TiSCH.

At this time, since all 6P requests generated from the child devices B to F are transmitted using an autonomous Rx cell of device A, there is a high probability of collision.

Also, in the 6P transaction of device A, since a 6P response to device A uses the autonomous Rx cell of device A, the 6P response to device A is in conflict with all the 6P requests of the child devices B to F.

Particularly, when the 6P response is lost due to a collision in the 6P transaction of device A, device A falls into a block state until a timeout occurs in order to wait for the 6P response.

When a maximum delay occurs due to the loss of a 6P response in a general setting, it takes about 45 seconds for a timeout, and during this time, requests from all child nodes are ignored. Thus, the loss of the 6P transaction has a great impact on the industrial wireless network of 6TiSCH.

Also, when both sequence numbers SeqNum do not match each other due to the loss of the 6P request/response packets, a 6P CLEAR command is generated to initialize both schedules, and a reservation using a 6P transaction is required again.

At this time, a 6P transaction is generated again. In this case, a vicious cycle may occur in which an increase in the number of 6P requests leads to loss due to collision. A conventional 6P transaction problem is in which 6P packets that are indiscriminately generated by multiple child devices in a high-traffic network having multiple devices are concentrated in a single autonomous Rx cell of a parent device.

In order to solve this problem, the present invention includes an element for reverse slot reservation in which a parent device initiates a 6P transaction to perform mutual slot reservation, unlike the conventional slot reservation scheme.

FIG. 5 shows a stack defined in a general low-power IoT wireless network of IETF.

In a general TCP/IP network layer model, IEEE 802.15.4 corresponds to the network access layer, which is layer 1, and IETF 6LoWPAN and RPL correspond to the Internet layer, which is layer 2.

6TiSCH defines a 6top layer, which is a sub-layer for flexible compatibility between layer 1 and layer 2, and the technique according to the present invention operates in the 6top layer.

The entire procedure in the device and method for reserve slot reservation in an industrial low-power wireless network according to the present invention is as follows.

A child device sends its slot demand to a parent device through an information element (IE) and a solicitation (SOLICIT) packet included in an enhanced beacon (EB).

A parent device starts reverse slot reservation by transmitting an offer (OFFER) packet to a device with high priority or a device selected in round-robin order when there is no priority on the basis of slot demands of child devices.

When an OFFER is received, a child device selects a required number of slots and responds using a Response packet to reserve the slots.

FIG. 6 shows an example of a reverse 6P transaction.

Figure 1:
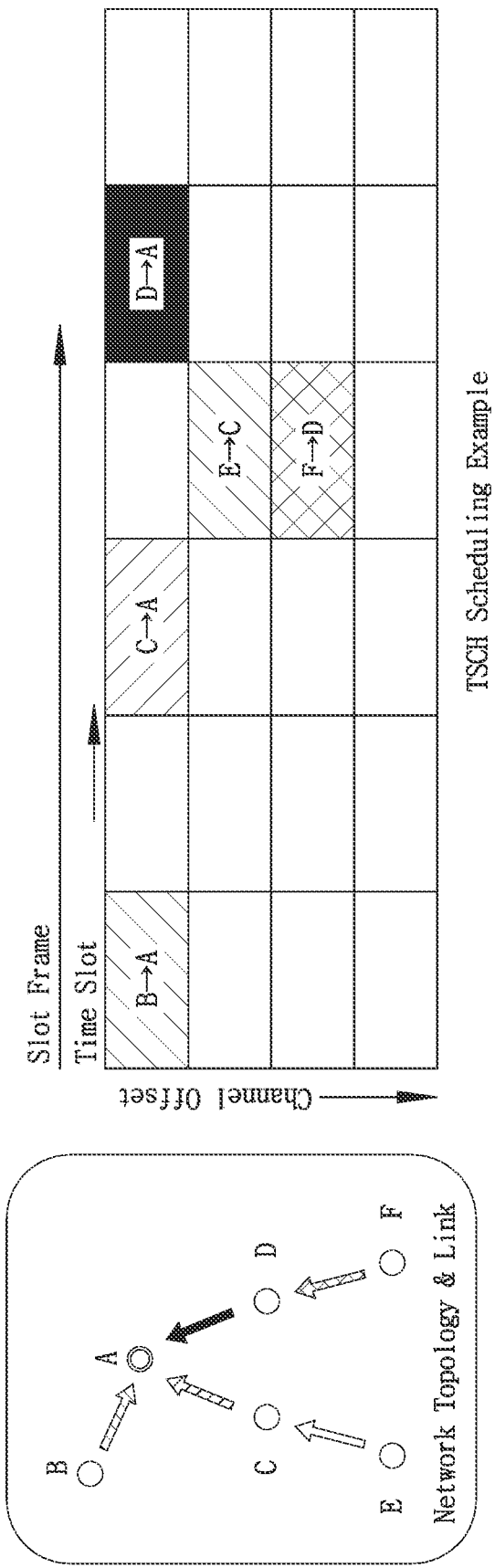
FIG. 1 is a configuration diagram showing general wireless network topology (on the left side) and example TSCH slot frame scheduling (on the right side)
Figure 2:
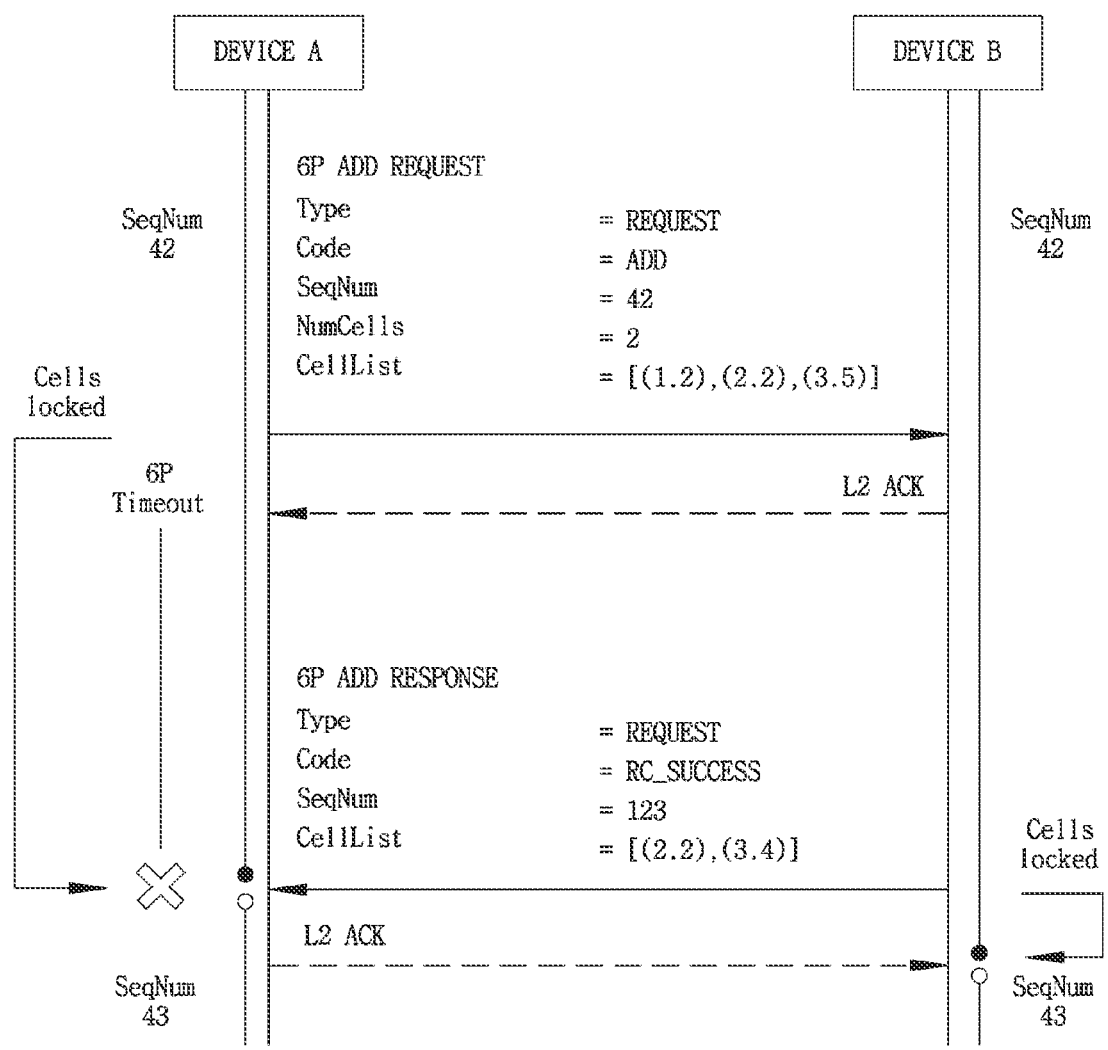
FIG. 2 is a configuration diagram showing an example of a general 2-step 6P transaction.
Figure 3:
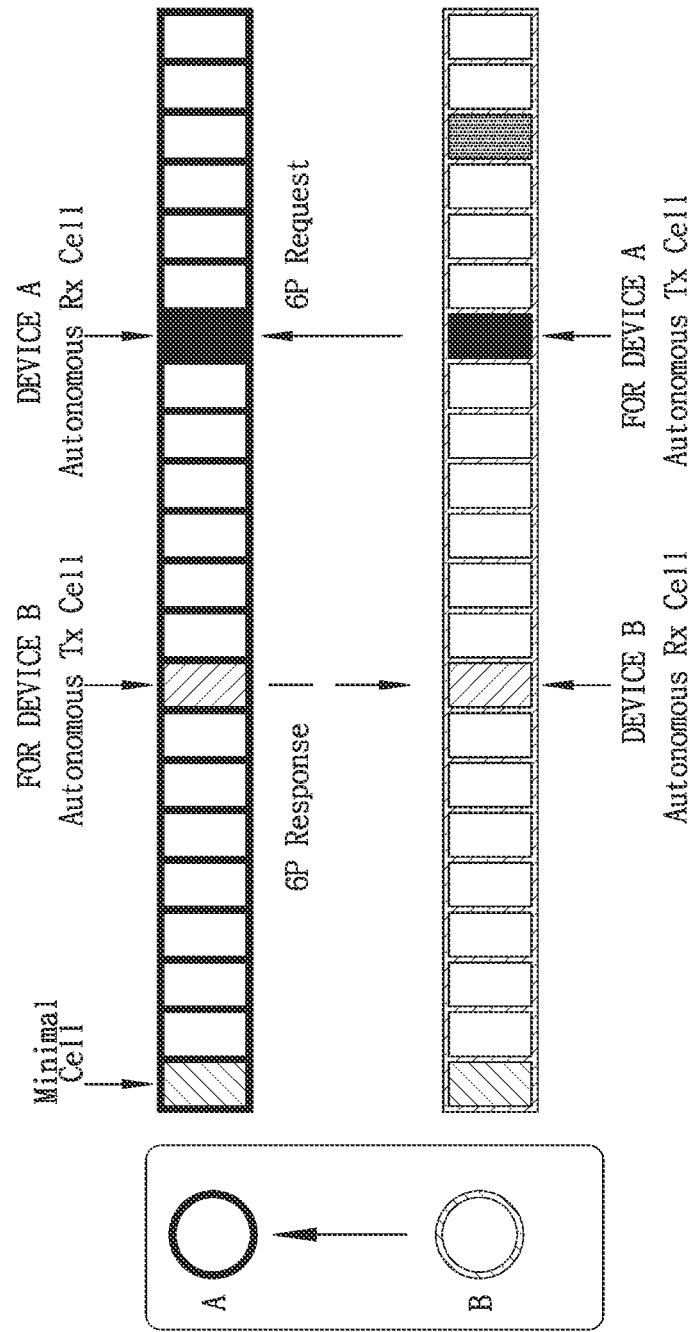
FIG. 3 is a configuration diagram showing an example of a 6P transaction using an autonomous cell.

A transaction is initiated by a parent device transmitting an OFFER packet, unlike the transaction scheme of FIG. 2 in which a transaction is initiated by REQUEST from a child device.

The parent device selects some slots from available slots of the parent device, adds the selected slots to CellList, and transmits an OFFER packet to the child device.

The length of CellList may vary depending on network settings.

The child device continuously computes a slot demand to be added (or deleted), and sends a response to the parent device on the basis of the slot demand when the OFFER packet is received from the parent device. Thus, reverse slot reservation is possible.

FIGS. 7A and 7B are configuration diagrams showing an OFFER request format and an OFFER response format.

A frame format for transmitting an OFFER uses the same structure as other ADD and DELETE packet frames, and an OFFER provider (parent) transmits a list of both reservable slots and deletable slots.

In CellList including reservable slots sent by the OFFER provider, the number of required slots is specified in NumAddCells, and a response is provided together with a list of slots to be added or deleted.

A device for reverse slot reservation in an industrial low-power wireless network according to the present invention will be described in detail as follows.

Figure 8:
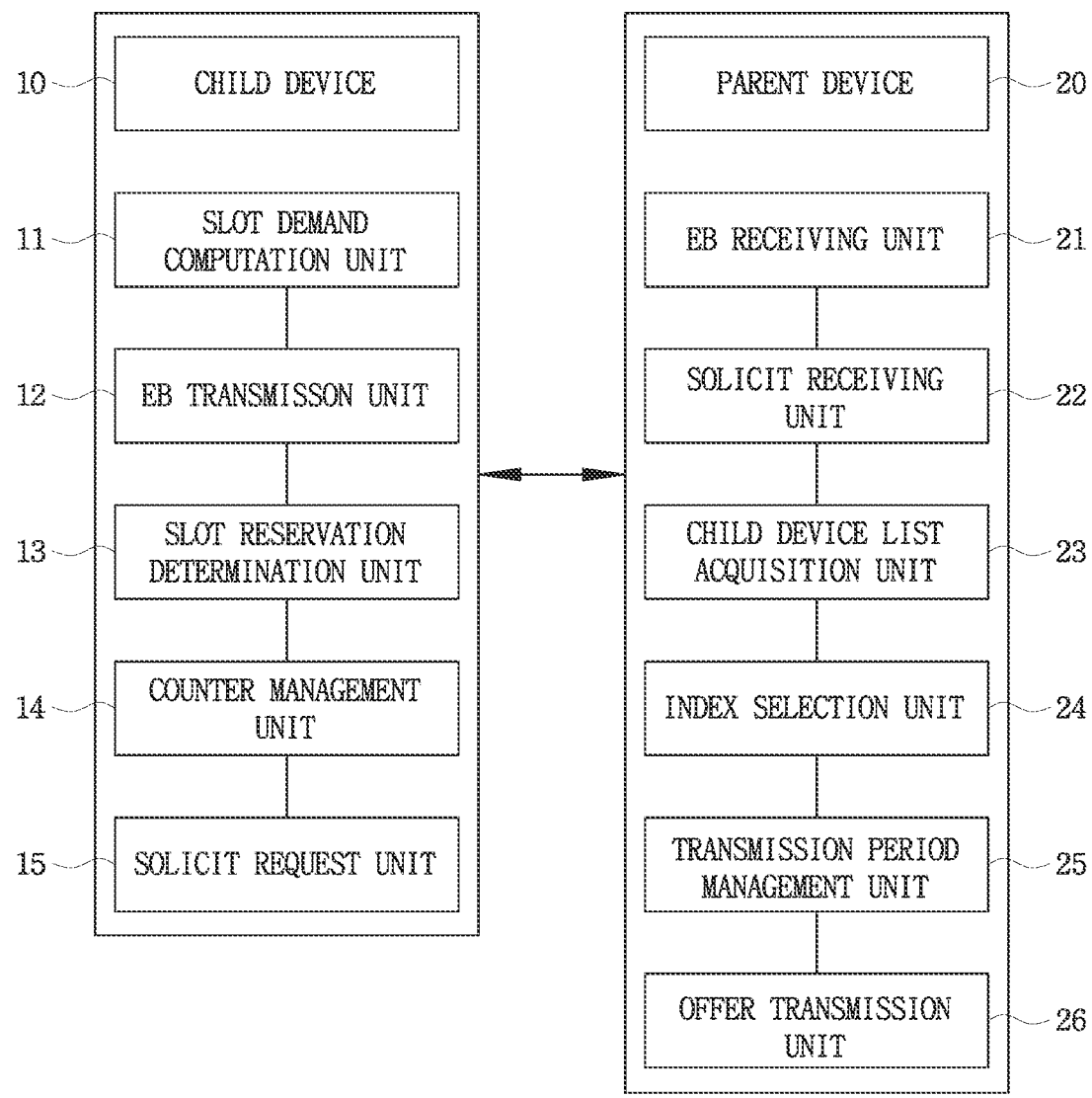
FIG. 8 is a block diagram of a device for reverse slot reservation in an industrial low-power wireless network.

FIG. 8 is a block diagram of a device for reverse slot reservation in an industrial low-power wireless network.

The device for reverse slot reservation in an industrial low-power wireless network according to the present invention includes a child device 10 configured to send its slot demand to a parent device through an IE and a SOLICIT packet included in an EB and configured to select a required number of slots and respond using a Response packet to reserve the slots when an OFFER is received and a parent device 20 configured to transmit an OFFER packet to a device with the highest priority or a device selected in round-robin order when there is no priority on the basis of slot demands of child devices to start reverse slot reservation and configured to select some slots from among available slots of the parent device, add the selected slots to CellList, and transmit the OFFER packet to a corresponding child device.

Here, the child device 10 continuously computes a slot demand to be added or deleted, and sends a response to the parent device on the basis of the slot demand when the OFFER packet is received from the parent device. Thus, reverse slot reservation is performed.

Also, when the slot demand included in the EB of each child device is not zero or when the SOLICIT is received, the parent device 20 transmits an OFFER to a corresponding child device to perform slot reservation.

Also, the parent device 20 continuously transmits the OFFER so that there are no devices that do not receive the OFFER even if a slot request is not generated in consideration of the possibility that the EB and the SOLICIT will not be normally transmitted due to continuous collision and interference.

Specifically, the child device 10 includes a slot demand computation unit 11 configured to compute a slot demand necessary to process traffic on the basis of traffic information measured in an upper layer (L2: Internet layer), an EB transmission unit 12 configured to expand an IE defined in the IEEE 802.15.4 and transmit an EB including a slot demand and an address of a target device that wants slot reservation, a slot reservation determination unit 13 configured to compare the computed slot demand to a slot demand computed in the previous period and determine whether an appropriate number of slots are currently reserved, a counter management unit 14 configured to initialize a counter when it is determined that the appropriate number of slots are reserved and increase the counter when the traffic is not resolved, and a SOLICIT request unit 15 configured to determine that the EB is lost and transmit a SOLICIT request when the counter is not initialized for a certain period of time.

Also, a parent device 20 includes an EB receiving unit 21 configured to receive an EB including an address and a slot demand of a target device, which wants slot reservation, from the child device 10, a SOLICIT receiving unit 22 configured to receive a SOLICIT request from the child device 10, a child device list acquisition unit 23 configured to acquire a list of child devices that have generated slot demands from a neighboring table, an index selection unit 24 configured to select an index of a device to which an OFFER is to be transmitted in a round-robin manner from the list of child devices, a transmission period management unit 25 configured to use a value obtained by dividing a basic period value, which ensures that the OFFER will be provided to each child device, by the number of child devices as a slot OFFER period, and an OFFER transmission unit 26 configured to transmit an OFFER including a list of available slots of the parent device to the device with the selected index.

The operation of a child device and a parent device in the device that has this configuration and that is for reverse slot reservation in an industrial low-power wireless network according to the present invention will be described in detail as follows.

Figure 9A:
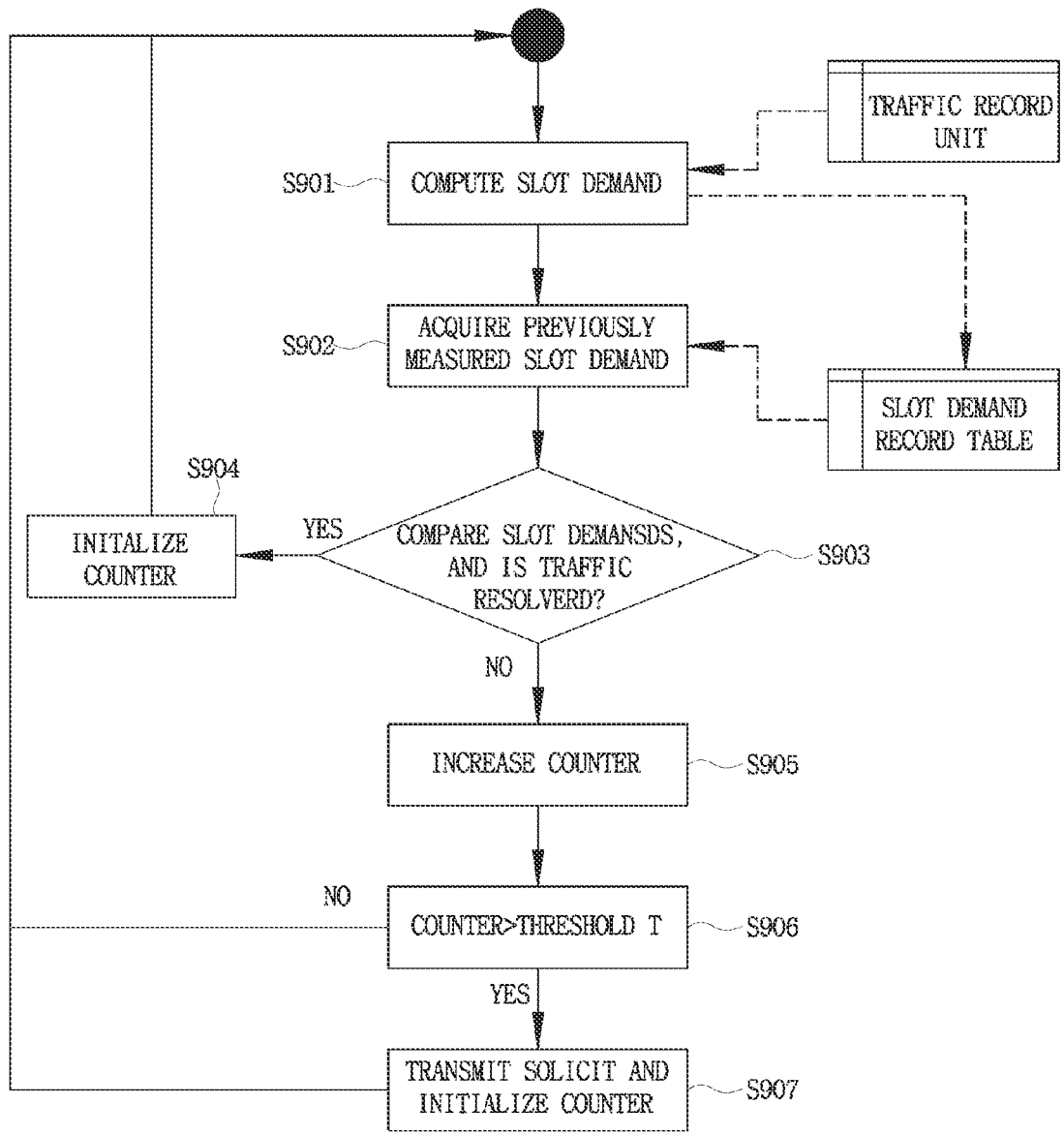
FIGS. 9A and 9B are configuration diagrams showing a solicitation (SOLICIT) transmission flowchart and a SOLICIT request format.
Figure 9B:
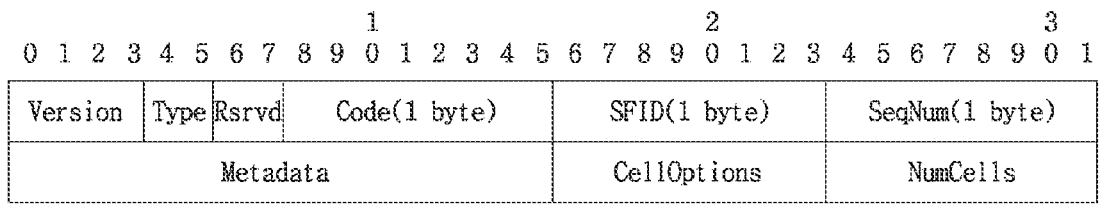

FIGS. 9A and 9B are configuration diagrams showing a SOLICIT transmission flowchart and a SOLICIT request format.

The operation of a child device is as follows.

Unlike a conventional 6P transaction, child devices may reserve slots when an OFFER is received from a parent device. This can prevent collisions due to indiscreet requests, but it takes a long time to receive an OFFER from a parent device. Therefore, child devices should periodically determine their slot demands and inform the parent device of the slot demands.

According to the present invention, each child device expands an IE defined in the IEEE 802.15.4 and transmits an EB including an address and a slot demand of a target device (=parent device) that wants slot reservation.

However, the EB may also be lost due to collision, and when the EB including the slot demand is not normally transmitted, the parent device cannot know the slot demand of the child device, and thus a more aggressive slot request technique is additionally used.

FIG. 9A is a flow of a SOLICIT request generated by a child device.

Each device computes a slot demand necessary to process traffic on the basis of traffic information measured in an upper layer (L2: Internet layer) (S901).

Also, each device compares the computed slot demand to a slot demand computed in the previous period (S902) and determines whether an appropriate number of slots are currently reserved (S903).

When a slot demand included in an EB is normally sent, a parent device may transmit an OFFER to a corresponding device in order for necessary slot reservation to proceed. However, when the EB is lost, an appropriate OFFER is not provided, and thus a slot demand may be continuously generated.

When it is determined that the appropriate number of slots are reserved, each device initializes a counter (S904).

On the contrary, when the traffic is not resolved, each device increases the counter (S905). When the counter is not initialized for a period of time (S906), each device determines that the EB is lost and transmits a SOLICIT request (S907).

FIG. 9B shows a frame format for transmitting a SOLICIT.

The frame format has a header that is almost similar to that of the existing 6P request, and only NumCells information for sending its own slot demand is maintained.

When an OFFER packet is received, a child device selects a required number of slots according to its own slot request (because the OFFER packet includes a list of available slots of a parent device) and responds using a Response packet in the format of FIG. 7B.

When the response is successfully transmitted, the sequence numbers of the parent device and the child device are updated, and slot reservation on both sides is completed.

The operation of a parent device is as follows.

Figure 10:
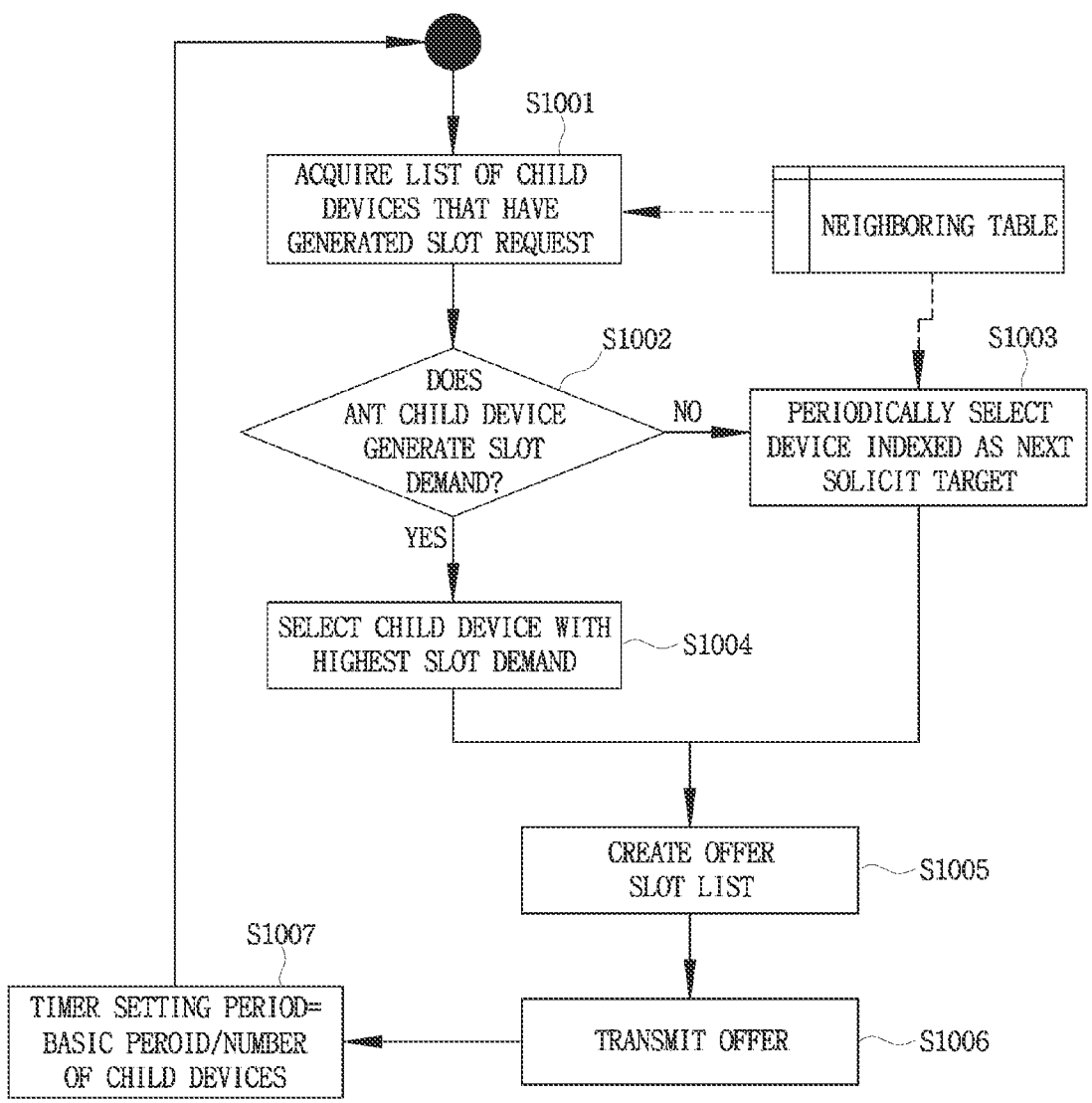
FIG. 10 is a flowchart showing a slot OFFER procedure.

FIG. 10 is a flowchart showing a slot OFFER procedure.

The parent device may know slot demands of child devices by receiving EBs and SOLICITS from the child devices.

Also, when the slot demand included in the EB of each child device is not zero or when the SOLICIT is received, the parent device should transmit an OFFER to a corresponding child device to perform slot reservation. Also, the EB and the SOLICIT may not be able to be normally transmitted due to continuous collision and interference. Thus, the parent device needs to continuously transmit an OFFER so that there are no devices that do not receive the OFFER even if a slot request is not generated.

FIG. 10 shows a slot offer transmission procedure performed by a parent device, and this procedure is performed periodically.

First, a parent device acquires a list of child devices that have generated slot demands from a neighboring table (S1001).

The parent device determines whether there is a child device that has generated a slot demand (S1002). When there is a child device that has generated a slot demand, the parent device selects a device having the highest slot demand from among the devices included in the list (S1004).

When no child device generates a slot demand, the parent device periodically selects a device indexed as the next SOLICIT target (S1003).

At this time, when the list is empty, it may be considered that all slot reservations have been made because no slot requests are received from child devices. However, assuming that a packet for a slot request is lost, some devices may be marginalized because they cannot receive the OFFER.

When a slot request generation list is empty, the parent device selects the index of a device to which the OFFER is to be transmitted from a list of its child devices in a round-robin manner.

The parent device creates an OFFER list (S1005) and transmits an OFFER including a list of available slots of the parent device to the device with the selected index (S1006).

When such a slot OFFER period is fixed, it takes more time to receive the next OFFER as the number of child devices increases. Thus, a variable period is used to transmit the OFFER to all child devices in the same period.

As the period of the slot OFFER, the parent device uses a value obtained by dividing a basic period value for ensuring that the OFFER is provided to each child device by the number of child devices (S1007).

The above-described device and method for reverse slot reservation in an industrial low-power wireless network according to the present invention may provide stable slot reservation of TSCH MAC. Thus, it is possible to reduce packet loss due to slot shortage and establish a robust network to increase normal network operation time.

The device and method for reverse slot reservation in an industrial low-power wireless network according to the present invention as described above have the following effects.

First, by using reverse slot reservation, stable slot reservation is possible even in a congested industrial wireless network environment.

Second, by allowing stable slot reservation between devices even in a congested 6TiSCH-based industrial wireless network, the stable operation of TSCH MAC is possible.

Third, by providing stable slot reservation of TSCH MAC, it is possible to reduce packet loss due to slot shortage and establish a robust network to increase normal network operation time.

Fourth, by using reverse slot reservation in which a parent device initiates a 6P transaction to perform mutual slot reservation, it is possible to prevent 6P packets indiscriminately generated by multiple child devices in a high-traffic network from being concentrated in a single autonomous Rx cell of the parent device.

As described above, it should be understood that the present invention is implemented in a modified form without departing from the essential features of the present invention.

The disclosed embodiments should be considered in a descriptive sense only and not for purposes of limitation. Therefore, the scope of the invention is defined not by the detailed description of the invention but by the appended claims, and all differences within the scope equivalent thereto will be construed as being included in the present invention.

What is claimed is:

1. A device for reverse slot reservation in an industrial low-power wireless network, the device comprising:
   a child device configured to send a slot demand of the child device to a parent device through an information element (IE) and a solicitation (SOLICIT) packet included in an enhanced beacon (EB) and configured to select a required number of slots and respond using a Response packet to reserve the slots when an offer (OFFER) is received; and a parent device configured to transmit an OFFER packet to a device with the highest priority or a device selected in round-robin order when there is no priority on the basis of slot demands of child devices to start reverse slot reservation and configured to select some slots from among available slots of the parent device, add the selected slots to CellList, and transmit the OFFER packet to a corresponding child device.

2. The device of claim 1, wherein the child device continuously computes a slot demand to be added or deleted, and sends a response to the parent device on the basis of the slot demand when the OFFER packet is received from the parent device, thereby performing reverse slot reservation.

3. The device of claim 1, wherein when the slot demand included in the EB of each of the child devices is not zero or when the SOLICIT is received, the parent device transmits an OFFER to a corresponding child device to perform slot reservation.

4. The device of claim 1, wherein the parent device continuously transmits an OFFER so that there are no devices that do not receive the OFFER even if a slot request is not generated in consideration of the possibility that the EB and SOLICIT will not be normally transmitted due to continuous collision and interference.

5. The device of claim 1, wherein the child device comprises:
a slot demand computation unit configured to compute a slot demand necessary to process traffic on the basis of traffic information measured in an upper layer (L2: Internet layer);
an EB transmission unit configured to expand an IE defined in IEEE 802.15.4 and transmit an EB including a slot demand and an address of a target device that wants slot reservation;
a slot reservation determination unit configured to compare the computed slot demand to a slot demand computed in a previous period and determine whether an appropriate number of slots are currently reserved;
a counter management unit configured to initialize a counter when it is determined that the appropriate number of slots are reserved and increase the counter when the traffic is not resolved; and
a SOLICIT request unit configured to determine that the EB is lost and transmit a SOLICIT request when the counter is not initialized for a certain period of time.

6. The device of claim 1, wherein the parent device comprises:
an EB receiving unit configured to receive an EB including an address and a slot demand of a target device, which wants slot reservation, from the child device;
a SOLICIT receiving unit configured to receive a SOLICIT request from the child device;
a child device list acquisition unit configured to acquire a list of child devices that have generated a slot demand from a neighboring table;
an index selection unit configured to select an index of a device to which an OFFER is to be transmitted in a round-robin manner from the list of child devices;
a transmission period management unit configured to use a value obtained by dividing a basic period value, which ensures that the OFFER will be provided to each child device, by the number of child devices as a slot OFFER period; and
an OFFER transmission unit configured to transmit an OFFER including a list of available slots of the parent device to the device with the selected index.

7. A method for reverse slot reservation in an industrial low-power wireless network, the method comprising:
sending, by a child device, a slot demand of the child device to a parent device through an information element (IE) and a solicitation (SOLICIT) packet included in an enhanced beacon (EB);
transmitting, by the parent device, an OFFER packet to a device with the highest priority or a device selected in a round-robin order when there is no priority on the basis of slot demands of child devices to start reverse slot reservation; and
selecting, by the child device, a required number of slots and responding using a response packet to reserve the slots when an OFFER is received.

8. The method of claim 7, wherein the parent device transmits the OFFER packet to initiate a transaction, the parent device selects some slots from among available slots of the parent device, adds the selected slots to CellList, and transmits the OFFER packet to the child device, and the length of CellList varies depending on network settings.

9. The method of claim 8, wherein the child device specifies, in NumAddCells, the number of required slots of CellList including reservable slots sent by the parent device, which is an OFFER provider, and responds with a list of slots to be added or deleted.

10. The method of claim 7, wherein the child device continuously computes a slot demand to be added or deleted, and sends a response to the parent device on the basis of the slot demand when the OFFER packet is received from the parent device, thereby performing reverse slot reservation.

11. The method of claim 7, wherein a SOLICIT request generated by the child device comprises:
computing a slot demand necessary to process traffic on the basis of traffic information measured in an upper layer (L2: Internet layer);
comparing the computed slot demand to a slot demand computed in a previous period and determining whether an appropriate number of slots are currently reserved;
initializing a counter when it is determined that the appropriate number of slots are reserved; and
increasing the counter when the traffic is not resolved and determining that the EB is lost and transmitting the SOLICIT request when the counter is not initialized for a certain period of time.

12. The method of claim 11, wherein
NumCells information for sending a slot demand of the child device is maintained in a frame for transmitting a SOLICIT, and
when the OFFER packet is received, the child device selects a required number of slots according to its own slot request and responds using a Response packet, and when the response is successfully transmitted, sequence numbers of the parent device and the child device are updated, and slot reservation on both sides is completed.

13. The method of claim 7, wherein a slot OFFER procedure of the parent device comprises:
receiving EBs and SOLICITs of child devices to check slot demands of the child devices; and transmitting an OFFER to a corresponding child device to perform slot reservation when the slot demand included in the EB of each of the child devices is not zero or when the SOLICIT is received.

14. The method of claim 13, wherein the parent device continuously transmits an OFFER so that there are no devices that do not receive the OFFER even if a slot request is not generated in consideration of the possibility that the EB and SOLICIT will not be normally transmitted due to continuous collision and interference.

15. The method of claim 7, wherein a slot OFFER procedure of the parent device comprises:
 acquiring a list of child devices that have generated a slot demand from a neighboring table;
 determining whether a child device has a slot demand and selecting a device having the highest slot demand from the list of child devices when some child devices have slot demands;
 periodically selecting a device indexed as the next SOLICIT target when no child device generates a slot demand; and
 creating an OFFER list and transmitting an OFFER including a list of available slots of the parent device to the selected device.

16. The method of claim 15, wherein the selecting of a device having the highest slot demand comprises selecting an index of a device to which an OFFER is to be transmitted from a list of child devices of the parent device in a round-robin manner when a slot request generation list is empty.

17. The method of claim 15, wherein in the transmitting of an OFFER,
 a variable period is used to transmit the OFFER to all of the child devices in the same period, and
 a value obtained by dividing a basic period value for ensuring that the OFFER will be provided to each child device by the number of child devices is used as the period of the slot OFFER.

* * * * *